(12) United States Patent
Jin et al.

(10) Patent No.: US 10,108,948 B2
(45) Date of Patent: Oct. 23, 2018

(54) METHOD, MOBILE TERMINAL AND POS MACHINE FOR IMPLEMENTING SELECTION OF SECURE ELEMENT IN NEAR FIELD COMMUNICATION

(71) Applicant: Huawei Device (Dongguan) Co., Ltd., Dongguan (CN)

(72) Inventors: Zhihao Jin, Beijing (CN); Miao Wang, Beijing (CN); Xinmiao Chang, Beijing (CN); Huangwei Wu, Shenzhen (CN)

(73) Assignee: HUAWEI DEVICE (DONGGUAN) CO., LTD., Dongguan (CN)

( * ) Notice: Subject to any disclaimer, the term of this patent is extended or adjusted under 35 U.S.C. 154(b) by 875 days.

(21) Appl. No.: 14/583,425

(22) Filed: Dec. 26, 2014

(65) Prior Publication Data

US 2015/0142589 A1    May 21, 2015

Related U.S. Application Data

(63) Continuation of application No. PCT/CN2013/077439, filed on Jun. 19, 2013.

(30) Foreign Application Priority Data

Jan. 22, 2013    (CN) .......................... 2013 1 0022697

(51) Int. Cl.
*G06Q 20/00* (2012.01)
*G06Q 20/20* (2012.01)
(Continued)

(52) U.S. Cl.
CPC ........... *G06Q 20/206* (2013.01); *G06F 21/35* (2013.01); *G06Q 20/322* (2013.01);
(Continued)

(58) Field of Classification Search
CPC ..................................................... G06Q 20/00
(Continued)

(56) References Cited

U.S. PATENT DOCUMENTS

| | | |
|---|---|---|
| 2007/0263596 A1 | 11/2007 | Charrat |
| 2009/0108064 A1 | 4/2009 | Fernandes et al. |

(Continued)

FOREIGN PATENT DOCUMENTS

| | | |
|---|---|---|
| CN | 101960761 A | 1/2011 |
| CN | 102122415 A | 7/2011 |

(Continued)

OTHER PUBLICATIONS

NFC Controller Interface (NCI) Specification, Technical Specification, NFC Forum, NCI 1.0, Nov. 6, 2012, 146 pages.

(Continued)

*Primary Examiner* — Russell S Glass
(74) *Attorney, Agent, or Firm* — Conley Rose, P.C.

(57) ABSTRACT

A method, a mobile terminal, and a point of sale (POS) machine for implementing selection of a secure element in near field communication are provided. The method includes receiving, by a near field communication controller on a local end, a first configuration instruction sent by a device host on the local end, where the first configuration instruction includes an environment characteristic used for selecting the secure element; configuring, by the near field communication controller, the environment characteristic in the near field communication controller according to the first configuration instruction; receiving, by the near field communication controller, a second configuration instruction sent by the device host; and configuring, by the near field communication controller according to the second configu- (Continued)

ration instruction, the environment characteristic in an attribute response instruction for communicating and interacting with a peer end.

8 Claims, 9 Drawing Sheets

(51) Int. Cl.
  *H04W 4/80* (2018.01)
  *G06Q 20/32* (2012.01)
  *H04B 5/00* (2006.01)
  *H04W 4/00* (2018.01)
  *G06F 21/35* (2013.01)
  *H04W 12/08* (2009.01)

(52) U.S. Cl.
  CPC .......... *H04B 5/0031* (2013.01); *H04W 4/008* (2013.01); *H04W 4/80* (2018.02); *H04W 12/08* (2013.01)

(58) Field of Classification Search
  USPC .......................................................... 705/18
  See application file for complete search history.

(56) References Cited

U.S. PATENT DOCUMENTS

| | | | |
|---|---|---|---|
| 2010/0153721 | A1 | 6/2010 | Mellqvist |
| 2010/0248710 | A1 | 9/2010 | Sklovsky et al. |
| 2011/0021175 | A1 | 1/2011 | Florek et al. |
| 2011/0130095 | A1 | 6/2011 | Naniyat et al. |
| 2012/0052801 | A1* | 3/2012 | Kulkarni .............. G06K 7/0008 455/41.1 |
| 2014/0136402 | A1 | 5/2014 | Roberts |

FOREIGN PATENT DOCUMENTS

| | | | |
|---|---|---|---|
| CN | 102271012 | A | 12/2011 |
| CN | 102404025 | A | 4/2012 |
| CN | 102498705 | A | 6/2012 |
| CN | 102790632 | A | 11/2012 |
| CN | 102842193 | A | 12/2012 |
| EP | 2106107 | A1 | 9/2009 |
| EP | 2458899 | A1 | 5/2012 |
| JP | 20070241351 | A | 9/2007 |
| JP | 2009303107 | A | 12/2009 |
| JP | 2011018377 | A | 1/2011 |
| JP | 2012039257 | A | 2/2012 |
| KR | 20080059277 | A | 6/2008 |
| KR | 20110094176 | A | 8/2011 |
| KR | 20110106839 | A | 9/2011 |

OTHER PUBLICATIONS

Foreign Communication From a Counterpart Application, European Application No. 13872468.7, Extended European Search Report dated Jan. 25, 2016, 6 pages.
Foreign Communication From a Counterpart Application, Chinese Application No. 201310022697.8, Chinese Office Action dated Oct. 23, 2015, 8 pages.
Foreign Communication From a Counterpart Application, Korean Application No. 10-2015-7021424, Korean Office Action dated Jan. 13, 2017, 7 pages.
Foreign Communication From a Counterpart Application, Korean Application No. 10-2015-7021424, English Translation of Korean Office Action dated Jan. 24, 2017, 9 pages.
Foreign Communication From a Counterpart Application, Korean Application No. 10-2015-7021424, Korean Notice of Allowance dated Jul. 27, 2017, 3 pages.
Partial English Translation and Abstract of Japanese Patent Application No. JPA2009303107, Jul. 25, 2016, 39 pages.
Partial English Translation and Abstract of Japanese Patent Application No. JPA201118377, Jul. 25, 2016, 68 pages.
Partial English Translation and Abstract of Japanese Patent Application No. JPA201239257, Jul. 25, 2016, 67 pages.
Foreign Communication From a Counterpart Application, Chinese Application No. 2015-552974, Chinese Office Action dated May 31, 2016, 3 pages.
Foreign Communication From a Counterpart Application, Chinese Application No. 2015-552974, English Translation of Chinese Office Action dated May 31, 2016, 3 pages.
Partial English Translation and Abstract of Chinese Patent Application No. CN102790632A, Feb. 28, 2015, 4 pages.
Foreign Communication From a Counterpart Application, PCT Application No. PCT/CN2013/077439, English Translation of International Search Report dated Oct. 17, 2013, 2 pages.
Foreign Communication From a Counterpart Application, PCT Application No. PCT/CN2013/077439, Written Opinion dated Oct. 17, 2013, 6 pages.

\* cited by examiner

METHOD, MOBILE TERMINAL AND POS MACHINE FOR IMPLEMENTING SELECTION OF SECURE ELEMENT IN NEAR FIELD COMMUNICATION

CROSS-REFERENCE TO RELATED APPLICATIONS

This application is a continuation of International Application No. PCT/CN2013/077439, filed on Jun. 19, 2013, which claims priority to Chinese Patent Application No. 201310022697.8, filed on Jan. 22, 2013, both of which are hereby incorporated by reference in their entireties.

TECHNICAL FIELD

The present invention relates to the field of communications technologies, and in particular, to a method, a mobile terminal and a point of sale (POS) machine for implementing selection of a secure element in near field communication (NFC).

BACKGROUND

Currently, an NFC technology refers to a technology that implements short-range communication between electronic devices by using a magnetic field induction principle. A user may implement contactless exchange of information or content, or transaction between electronic devices by placing the electronic devices close to each other. An operating frequency of the NFC technology is 13.56 megahertz (MHz), and an effective range for communication is 0-20 centimeter (cm).

With popularization of the NFC technology, an NFC function is also available on a mobile terminal. For example, as an application of the NFC technology, mobile payment has been applied and developed rapidly. The user makes payment by using an NFC-enabled mobile terminal (such as a mobile phone) in combination with a corresponding POS machine.

In an NFC controller interface (NCI) specifications standard published by the NFC forum, a secure element (SE) routing table is set. The SE routing table enables default selection of an SE, in a case in which a device host (DH) of the mobile terminal is shut down, according to basic information of the NFC communication that is obtained by an NFC controller, for example, enables default selection of an SE according to an application identifier (AID) of the SE, a radio frequency protocol, and an NFC technology type.

However, when the DH is shut down, characteristics of the NFC communication are limited. In a solution in the prior art, the SE can be selected only by using the characteristics of the NFC communication that are obtained by the NFC controller. Consequently, some security risks exist when the SE selected by the NFC controller makes payment with a corresponding POS machine, which causes losses to the user and also reduces practicality of the prior art.

SUMMARY

Embodiments of the present invention provide a method, a mobile terminal and a POS machine for implementing selection of a secure element in NFC so that the mobile terminal selects a secure element according to an environment characteristic and completes communication and interaction with the POS machine.

According to a first aspect, an embodiment of the present invention provides a configuration method for implementing selection of a secure element in NFC, where the configuration method includes receiving, by an NFC controller on a local end, a first configuration instruction sent by a device host on the local end, where the first configuration instruction includes an environment characteristic used for selecting the secure element; configuring, by the NFC controller, the environment characteristic in the NFC controller according to the first configuration instruction; receiving, by the NFC controller, a second configuration instruction sent by the device host; and configuring, by the NFC controller according to the second configuration instruction, the environment characteristic in an attribute response instruction for communicating and interacting with a peer end, so as to continue communicating and interacting with the peer end according to the configured attribute response instruction and further complete the selection of the secure element.

In a first possible implementation manner, after the configuring, by the NFC controller according to the second configuration instruction, the environment characteristic in an attribute response instruction for communicating and interacting with a peer end, the method further includes receiving, by the NFC controller, a routing table generated by the device host according to the environment characteristic.

With reference to the first aspect or the first possible implementation manner of the first aspect, in a second possible implementation manner, the environment characteristic includes a set of one or more of the following attributes: a location attribute, a limit attribute, a time attribute, and a POS machine attribute.

With reference to the first aspect or the second possible implementation manner of the first aspect, in a third possible implementation manner, the environment characteristic includes the limit attribute, and before the receiving, by an NFC controller on a local end, a first configuration instruction sent by a device host on the local end, the configuration method further includes instructing, by the device host, a first secure element corresponding to the limit attribute to separate a second secure element from the first secure element; and receiving, by the NFC controller, a registration command sent by the second secure element.

According to a second aspect, an embodiment of the present invention provides an interaction method for implementing selection of a secure element in NFC, where the interaction method includes receiving, by an NFC controller, an attribute request instruction sent by a peer end, where the attribute request instruction includes a first environment characteristic supported by the peer end; sending, by the NFC controller according to the attribute request instruction, an attribute response instruction to the peer end, where the attribute response instruction includes a second environment characteristic used by the NFC controller to select the secure element; receiving, by the NFC controller, a selection instruction sent by the peer end, where the selection instruction includes a type identifier of the secure element required by the peer end; and selecting, by the NFC controller according to the selection instruction, a secure element corresponding to the first environment characteristic and the type identifier, so as to complete interaction with the peer end.

In a first possible implementation manner, the selecting, by the NFC controller according to the selection instruction, a secure element corresponding to the first environment characteristic and the type identifier, includes selecting, by the NFC controller according to a routing table, the secure element corresponding to the first environment characteristic and the type identifier.

According to a third aspect, an embodiment of the present invention provides an interaction method for implementing selection of a secure element in NFC, where the interaction method includes sending a first attribute request instruction, where the first attribute request instruction includes a first environment characteristic supported by a local end; receiving a first attribute response instruction, where the first attribute response instruction includes a second environment characteristic used by a peer end to select the secure element; determining whether an attribute set of the first environment characteristic includes an attribute set of the second environment characteristic; and sending a selection instruction if the attribute set of the first environment characteristic includes the attribute set of the second environment characteristic, where the selection instruction includes a type identifier of a secure element required by the local end.

In a first possible implementation manner, the determining whether an attribute set of the first environment characteristic includes an attribute set of the second environment characteristic further includes obtaining a third environment characteristic if the attribute set of the first environment characteristic excludes the attribute set of the second environment characteristic, where the third environment characteristic includes an attribute set that is excluded from the first environment characteristic and is included in the second environment characteristic; and sending a second attribute request instruction, where the second attribute request instruction includes the third environment characteristic.

According to a fourth aspect, an embodiment of the present invention provides a mobile terminal for implementing selection of a secure element in NFC, where the mobile terminal includes a receiving unit configured to receive a first configuration instruction sent by a device host on a local end, where the first configuration instruction includes an environment characteristic used for selecting the secure element; and a configuring unit configured to configure the environment characteristic in an NFC controller according to the first configuration instruction; where the receiving unit is further configured to receive a second configuration instruction sent by the device host; and the configuring unit is further configured to, according to the second configuration instruction, configure the environment characteristic in an attribute response instruction for communicating and interacting with a peer end, so as to continue communicating and interacting with the peer end according to the configured attribute response instruction and further complete the selection of the secure element.

In a first possible implementation manner, the receiving unit is further configured to receive a routing table generated by the device host according to the environment characteristic.

With reference to the fourth aspect or the first possible implementation manner of the fourth aspect, in a second possible implementation manner, the environment characteristic received by the receiving unit includes a set of one or more of the following attributes: a location attribute, a limit attribute, a time attribute, and a POS machine attribute.

With reference to the fourth aspect or the second possible implementation manner of the fourth aspect, in a third possible implementation manner, when the environment characteristic includes the limit attribute and after the device host instructs a first secure element corresponding to the limit attribute to separate a second secure element from the first secure element, the receiving unit is further configured to receive a registration command sent by the second secure element.

According to a fifth aspect, an embodiment of the present invention provides a mobile terminal for implementing selection of a secure element in NFC, where the mobile terminal includes a receiving unit configured to receive an attribute request instruction sent by a peer end, where the attribute request instruction includes a first environment characteristic supported by the peer end; a sending unit configured to, according to the attribute request instruction, send an attribute response instruction to the peer end, where the attribute response instruction includes a second environment characteristic used by the mobile terminal to select the secure element; the receiving unit, further configured to receive a selection instruction sent by the peer end, where the selection instruction includes a type identifier of the secure element required by the peer end; and a selecting unit configured to select, according to the selection instruction, a secure element corresponding to the first environment characteristic and the type identifier, so as to complete interaction with the peer end.

In a first possible implementation manner, the selecting unit is configured to select, according to a routing table, the secure element corresponding to the first environment characteristic and the type identifier.

According to a sixth aspect, an embodiment of the present invention provides a POS machine for implementing selection of a secure element in NFC, where the POS machine includes a sending unit configured to send a first attribute request instruction, where the first attribute request instruction includes a first environment characteristic supported by a local end; a receiving unit configured to receive a first attribute response instruction, where the first attribute response instruction includes a second environment characteristic used by a peer end to select the secure element; and a determining unit configured to determine whether an attribute set of the first environment characteristic includes an attribute set of the second environment characteristic, where the sending unit is further configured to send a selection instruction if the attribute set of the first environment characteristic includes the attribute set of the second environment characteristic, where the selection instruction includes a type identifier of the secure element required by a local end.

In a first possible implementation manner, the POS machine further includes an obtaining unit configured to obtain a third environment characteristic if the attribute set of the first environment characteristic excludes the attribute set of the second environment characteristic, where the third environment characteristic includes an attribute set that is excluded from the first environment characteristic and is included in the second environment characteristic, where the sending unit is further configured to send a second attribute request instruction, where the second attribute request instruction includes the third environment characteristic.

According to a seventh aspect, an embodiment of the present invention provides a system for implementing selection of a secure element in NFC, where the system includes the mobile terminal provided in the fourth aspect or the fifth aspect of the embodiment of the present invention and the POS machine provided in the sixth aspect of the embodiment of the present invention.

According to an eighth aspect, an embodiment of the present invention provides a mobile terminal for implementing selection of a secure element in NFC, where the mobile terminal includes an NFC controller and a device host, where the device host is configured to send a first configuration instruction, where the first configuration instruction includes an environment characteristic used for selecting the secure element; the NFC controller is configured to receive the first configuration instruction and configure the environment characteristic according to the first configuration instruction; the device host is further configured to send a second configuration instruction; and the NFC controller is further configured to receive the second configuration instruction, and configure, according to the second configuration instruction, the environment characteristic in an attribute response instruction for communicating and interacting with a peer end, so as to continue communicating and interacting with the peer end according to the configured attribute response instruction and further complete the selection of the secure element.

Therefore, by applying a method, a mobile terminal and a POS machine for implementing selection of a secure element in NFC according to embodiments of the present invention, an NFC controller on a local end receives a configuration instruction sent by a DH on the local end, where the configuration instruction includes an environment characteristic used for selecting an SE; and configures the environment characteristic, which is used for selecting the SE, in an attribute response instruction for communicating and interacting with a peer end. This solves a problem in the solution of the prior art that an SE can be selected only by using characteristics of NFC communication that are obtained by the NFC controller. In addition, based on the foregoing method, when communication and interaction are performed with the peer end subsequently, the NFC controller on the local end can select an SE according to a configured environment characteristic regardless of whether the DH on the local end is started or shut down, thereby improving practicality of the prior art.

DETAILED DESCRIPTION

To make the objectives, technical solutions, and advantages of the present invention clearer, the following further describes the embodiments of the present invention in detail with reference to the accompanying drawings.

Embodiment 1

Figure 1:
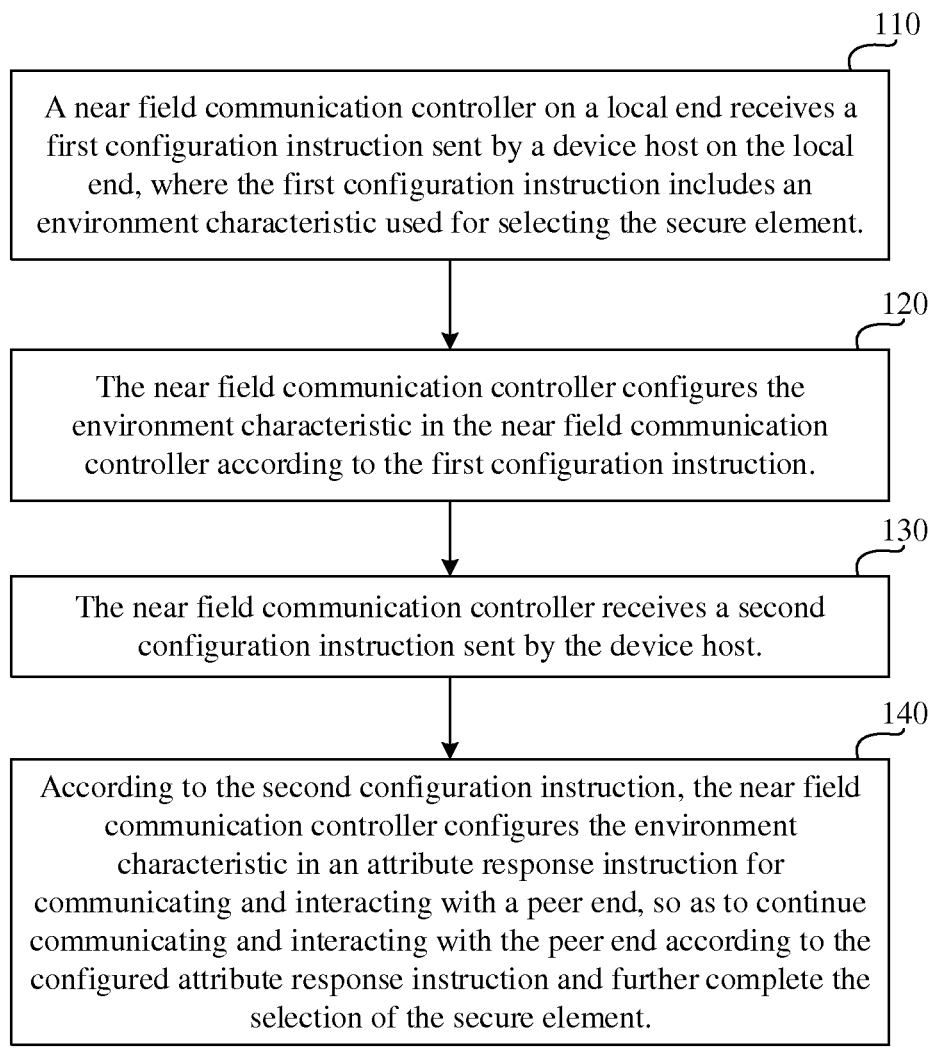
FIG. 1 is a flowchart of a configuration method for implementing selection of a secure element in NFC according to Embodiment 1 of the present invention.

By using FIG. 1 as an example, the following describes a configuration method for implementing selection of a secure element in NFC according to an embodiment of the present invention. FIG. 1 is a flowchart of a configuration method for implementing selection of a secure element in NFC according to Embodiment 1 of the present invention. An entity for implementing the embodiment shown in FIG. 1 is an NFC controller located in a mobile terminal. As shown in FIG. 1, the embodiment includes the following steps.

Step 110: An NFC controller on a local end receives a first configuration instruction sent by a device host on the local end, where the first configuration instruction includes an environment characteristic used for selecting the secure element.

In the embodiment of the present invention, the mobile terminal serves as the local end, and the mobile terminal includes a DH, an NFC, and multiple SEs. A configuration process needs to be performed when the DH on the local end is started (or powered on). The DH on the local end sends the first configuration instruction to the NFC controller on the local end, where the first configuration instruction includes the environment characteristic used for selecting the secure element; and the NFC controller on the local end receives the first configuration instruction.

In the embodiment of the present invention, the environment characteristic is a characteristic except NFC signal characteristics such as an NFC waveform and a frame format when the mobile terminal performs NFC interaction with a POS machine.

It is exemplary but not limited to that the first configuration instruction may be a CORE_SET_CONFIG_CMD instruction.

Step 120: The NFC controller configures the environment characteristic in the NFC controller according to the first configuration instruction.

After receiving the first configuration instruction, the NFC controller on the local end parses the configuration instruction and extracts carried content, that is, the environment characteristic used for selecting the SE. The NFC controller on the local end configures the environment characteristic, which is used for selecting the SE, in a local specified storage location. In the embodiment of the present invention, the environment characteristic is a basis for the NFC controller on the local end to select an SE in a subsequent interaction process.

Step 130: The NFC controller receives a second configuration instruction sent by the device host.

After setting the environment characteristic used for selecting an SE in step 120, the NFC controller on the local end receives the second configuration instruction sent by the DH on the local end.

It is exemplary but not limited to that the second configuration instruction may be a CORE_SET_CONFIG_CMD instruction.

Step 140: According to the second configuration instruction, the NFC controller configures the environment characteristic in an attribute response instruction for communicating and interacting with a peer end, so as to continue communicating and interacting with the peer end according to the configured attribute response instruction and further complete the selection of the secure element.

According to the second configuration instruction, the NFC controller on the local end configures the environment characteristic, which is used for selecting an SE, in the attribute response instruction for communicating and interacting with the peer end. In the embodiment of the present invention, in step 130 and step 140, the NFC controller on the local end configures the instruction for communicating with the peer end, so that the environment characteristic used for selecting an SE is carried when the NFC controller on the local end communicates with the peer end subsequently, and further the selection of the SE is completed.

Therefore, by applying a configuration method for implementing selection of a secure element in NFC according to an embodiment of the present invention, an NFC controller on a local end receives a configuration instruction sent by a DH on the local end, where the configuration instruction includes an environment characteristic used for selecting an SE; and configures the environment characteristic, which is used for selecting the SE, in an attribute response instruction for communicating and interacting with a peer end. This solves a problem in the solution of the prior art that an SE can be selected only by using characteristics of NFC communication that are obtained by the NFC controller. In addition, based on the foregoing method, when communication and interaction are performed with the peer end subsequently, the NFC controller on the local end can select an SE according to a configured environment characteristic regardless of whether the DH on the local end is started or shut down, thereby improving practicality of the prior art.

To make objectives, technical solutions, and advantages of the present invention clearer, the following describes specific embodiments of the present invention in more detail with reference to accompanying drawings.

Embodiment 2

Figure 2:
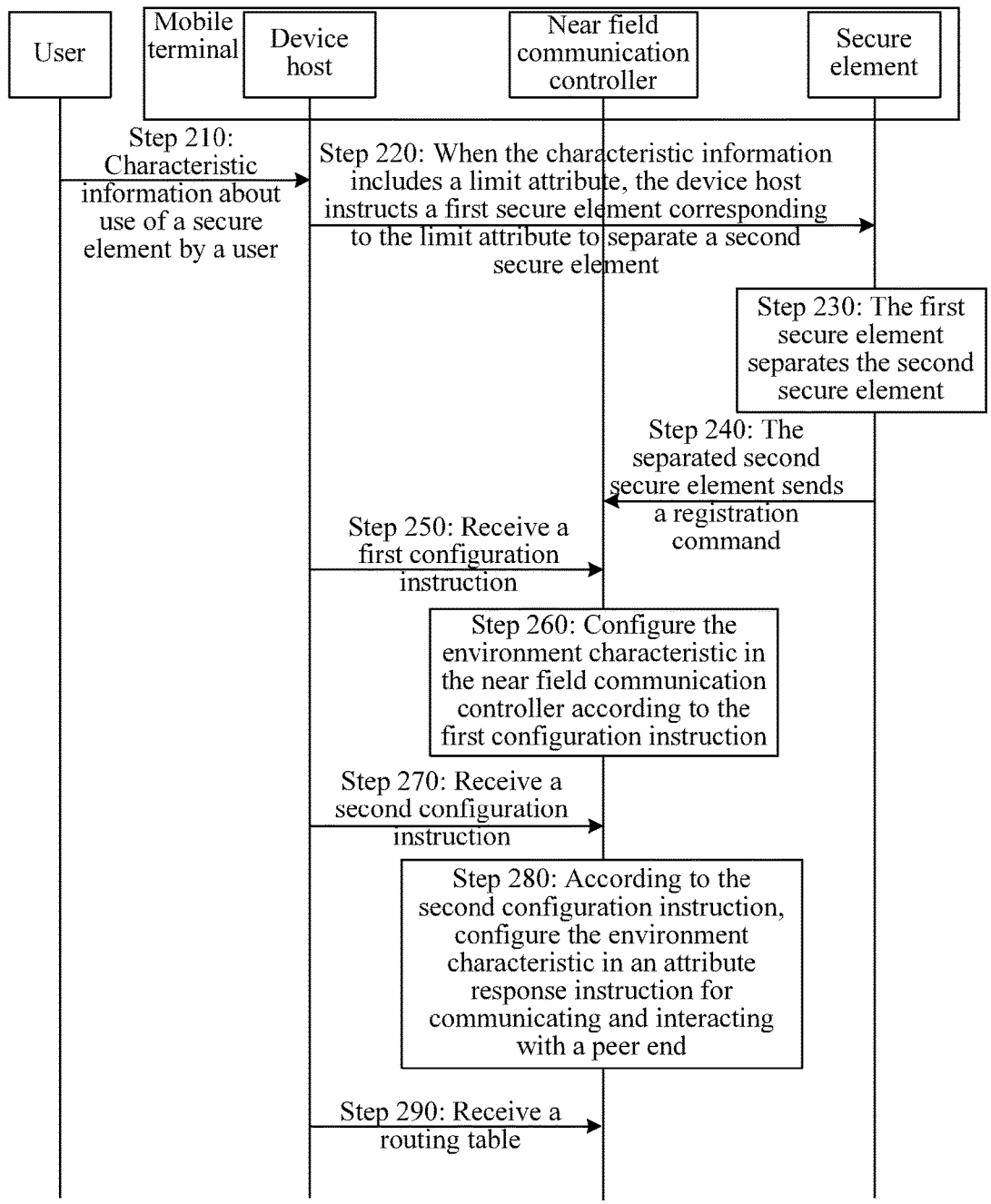
FIG. 2 is a signaling diagram of a configuration method for implementing selection of a secure element in NFC according to Embodiment 2 of the present invention.

By using FIG. 2 as an example, the following describes a configuration method for implementing selection of a secure element in NFC according to an embodiment of the present invention. FIG. 2 is a signaling diagram of a configuration method for implementing selection of a secure element in NFC according to Embodiment 2 of the present invention. As shown in FIG. 2, the embodiment includes the following steps.

Step 210: A device host on a local end receives characteristic information about use of a secure element by a user, where the characteristic information is input by the user.

In the embodiment of the present invention, a configuration process needs to be performed when the DH on the local end is started. Before the DH on the local end receives the characteristic information about use of the secure element by the user, where the characteristic information is input by the user, the user starts a payment application in a mobile terminal, and the DH on the local end initializes an NFC controller on the local end to make it enter an operating state. During the initialization, the DH on the local end obtains an environment characteristic supported by the NFC controller on the local end.

After obtaining the environment characteristic supported by the NFC controller on the local end, the DH on the local end displays the environment characteristic supported by the NFC controller on the local end to the user, and the user inputs the characteristic information about the use of the SE by the user according to the displayed environment characteristic. The DH on the local end receives the characteristic information about the use of the SE by the user that is input by the user, where the characteristic information about the use of the SE by the user includes a characteristic of using the SE, where the characteristic is input by the user.

The characteristic information about the use of the SE by the user includes a set of one or more of the following attributes: a location attribute, a limit attribute, a time attribute, and a POS machine attribute.

In an example, the characteristic information about the use of the SE by the user is that the user presets that a first SE (SE1) is used when the user is in a location A, and a payment limit is imposed when the DH on the local end is shut down; the user presets that a second SE (SE2) is used when the user is in a location B, and no payment limit is imposed when the DH on the local end is shut down; the user presets that a third SE (SE3) is used from Monday to Friday, and a payment limit is imposed when the DH on the local end is shut down; and the user presets that a fourth SE (SE4) is used on Saturday or Saturday, and a payment limit is imposed when the DH on the local end is shut down. The characteristic information about the use of the SE by the user may be set according to conditions of the user.

Step 220: When the characteristic information includes a limit attribute, the device host instructs a first secure element corresponding to the limit attribute to separate a second secure element from the first secure element.

When the characteristic information about the use of the SE by the user includes the limit attribute, the DH on the local end sends a notification command to the first SE corresponding to the limit attribute according to the characteristic information about the use of the SE by the user, where the notification command is used to instruct the first SE to separate from the first secure element a second SE that is preset by the user to impose a payment limit.

It should be noted that, a main purpose of the instructing, by the DH on the local end, the first SE corresponding to the limit attribute to separate the second SE from the first SE, is that a payment limit is imposed when the DH on the local end is shut down, so as to protect the mobile terminal of the user from unrestricted use after the mobile terminal is lost, and ensure security of user interaction data.

Step 230: The first secure element separates the second secure element from the first secure element.

After the first SE receives the notification command sent by the DH on the local end, the first SE separates the second SE from the first SE, and the first SE and the second SE have a same type identifier.

Further, the separating the second SE from the first SE is described below by using an example in which "the user presets that a first SE (SE1) is used when the user is in a location A, and a payment limit is imposed when the DH on the local end is shut down". If the characteristic information about the use of the SE by the user includes the limit attribute, after determining that the characteristic information about the use of the SE by the user includes the limit attribute, the DH on the local end sends a notification command to the SE1, where the notification command is used to instruct the SE1 to separate from the SE1 an SE1' that is preset by the user to impose a payment limit. The SE1 separates the SE1' from the SE1 according to the notification command. The SE1 and the SE1' have a same type identifier. The SE1' is used to impose a payment limit when the DH on the local end is shut down, which can protect the mobile terminal of the user from unrestricted use after the mobile terminal is lost, and ensure security of user interaction data.

Step 240: The separated second secure element sends a registration command to an NFC controller on the local end.

After the second SE is separated from the first SE, the second SE sends the registration command to the NFC controller on the local end. The NFC controller on the local end receives the registration command, where the registration command is used to instruct the NFC controller on the local end to replace the first SE with the second SE in subsequent steps and use the second SE as an SE corresponding to the limit attribute.

Step 250: The NFC controller on the local end receives a first configuration instruction sent by the device host on the local end, where the first configuration instruction includes an environment characteristic used for selecting the secure element.

After the foregoing step is implemented, the DH on the local end sends the first configuration instruction to the NFC controller on the local end, where the first configuration instruction includes the environment characteristic used for selecting the SE; and the NFC controller on the local end receives the first configuration instruction.

In the embodiment of the present invention, the environment characteristic is a characteristic except NFC signal characteristics such as an NFC waveform and a frame format when the mobile terminal performs NFC interaction with a POS machine.

It is exemplary but not limited to that the first configuration instruction may be a CORE_SET_CONFIG_CMD instruction.

Step 260: The NFC controller configures the environment characteristic in the NFC controller according to the first configuration instruction.

After receiving the first configuration instruction, the NFC controller on the local end parses the configuration instruction and extracts carried content, that is, the environment characteristic used for selecting the SE. The NFC controller on the local end configures the environment characteristic, which is used for selecting the SE, in a local specified storage location. In the embodiment of the present invention, the environment characteristic is a basis for the NFC controller on the local end to select an SE in a subsequent interaction process.

Further, in the embodiment of the present invention, the first configuration instruction is extended with a new parameter type 0x84 (NFCC_ENV_STATE), where the parameter is used to carry an environment characteristic used for selecting an SE, and the parameter type includes a 1-byte value. It is exemplary but not limited to that Table 1 shows an extended first configuration instruction.

TABLE 1

| First configuration instruction CORE_SET_CONFIG_CMD | | |
|---|---|---|
| Field | Length | Value |
| Number of parameters | 1 byte | n, which identifies the number of parameters included in the command |

TABLE 1-continued

| First configuration instruction CORE_SET_CONFIG_CMD | | | |
|---|---|---|---|
| Field | Length | | Value |
| Parameter [1 ... n] | 3 bytes | Parameter type | 1 byte | 0x84 |
| | | Parameter length | 1 byte | 1 |
| | | Parameter value | 1 byte | Environment characteristic used for selecting an SE |

In the embodiment of the present invention, the parameter 0x84 carries the environment characteristic used for selecting an SE, where the environment characteristic includes a set of one or more of the following attributes: a limit attribute, a POS machine attribute, a time attribute, and a location attribute, and the parameter 0x84 further carries a DH shutdown attribute and a power-off attribute of the local end, but the DH shutdown attribute and the power-off attribute of the local end are already set in the prior art. Referring to the content in Table 1, the specific content of the parameter 0x84 is a value of a 1-byte length. The NFC controller on the local end configures the specific content of the parameter 0x84 in a storage location of the NFC controller on the local end. In the embodiment of the present invention, the NFC controller on the local end configures the environment characteristic, which is carried in the parameter 0x84 and used for selecting an SE, in a second byte of a characteristic of the NFC controller on the local end. It is exemplary but not limited to that Table 2 shows an environment characteristic configured by the NFC controller and used for selecting an SE.

TABLE 2

| Environment characteristic configured by the NFC controller and used for selecting an SE | | | | | | |
|---|---|---|---|---|---|---|
| Second byte of the characteristic of the NFC controller | 0 | 0 | | | | Reserved field |
| | | x | | | | Limit attribute: set to 1 if the attribute is used to select a secure element |
| | | | x | | | POS machine attribute: set to 1 if the attribute is used to select a secure element |
| | | | | x | | Time attribute: set to 1 if the attribute is used to select a secure element |
| | | | | | x | Location attribute: set to 1 if the attribute is used to select a secure element |
| | | | | | | x | DH shutdown of a local end: set to 1 if the attribute is supported |
| | | | | | | | x | Power-off: set to 1 if the attribute is supported |

Referring to the content in Table 2, on the basis of the prior art that supports only two attributes, that is, the DH shutdown attribute and the power-off attribute of the local end, a set of one or more of four environment characteristic attributes, that is, the limit attribute, a POS identifier, the time attribute, and the location attribute is added in the embodiment of the present invention, and used as the environment characteristic used for selecting an SE.

In an example, the environment characteristic used for selecting an SE includes the time attribute and the location attribute, and therefore, corresponding bits of the time attribute, the location attribute, and the DH shutdown attribute and the power-off attribute of the local end are configured to 1 to indicate the environment characteristic used by the NFC controller on the local end to select an SE.

Further, in the embodiment of the present invention, each of the limit attribute, the POS identifier, the time attribute, and the location attribute has three default selection branches.

In an example, the location attribute has three branches by default, that is, three types of conditions for configuring three different locations A, B, C for the location attribute. In this case, the characteristic used by the NFC controller to select the SE needs to be extended with bytes to indicate the different branches.

Step 270: The NFC controller receives a second configuration instruction sent by the device host.

After setting the environment characteristic used for selecting the SE, the NFC controller on the local end receives the second configuration instruction sent by the DH on the local end.

It is exemplary but not limited to that the second configuration instruction may be a CORE_SET_CONFIG_CMD instruction.

Step 280: According to the second configuration instruction, the NFC controller configures the environment characteristic in an attribute response instruction for communicating and interacting with a peer end, so as to continue communicating and interacting with the peer end according to the configured attribute response instruction and further complete the selection of the secure element.

According to the second configuration instruction, the NFC controller on the local end configures the environment characteristic, which is used for selecting the SE, in the attribute response instruction for communicating and interacting with the peer end. In the embodiment of the present invention, in step 270 and step 280, the NFC controller on the local end configures the instruction for communicating with the peer end, so that the environment characteristic used for selecting the SE is carried when the NFC controller on the local end communicates with the peer end subsequently, and further the selection of the SE is completed.

Further, in the embodiment of the present invention, the second configuration instruction is extended with a new parameter type 0x5A, where the parameter is used to carry the environment characteristic used by the NFC controller on the local end to select an SE when communication is performed with the peer end. The parameter type includes a 1-byte value and is used to indicate the environment characteristic used by the NFC controller on the local end to select an SE. It is exemplary but not limited to that Table 3 shows an extended second configuration instruction.

TABLE 3

Second configuration instruction
CORE_SET_CONFIG_CMD

| Field | Length | Value | | |
|---|---|---|---|---|
| Number of parameters | 1 byte | n, which identifies the number of parameters included in the command | | |
| Parameter [1 . . . n] | 3 bytes | Parameter type | 1 byte | 0x5A |
| | | Parameter length | 1 byte | 1 |
| | | Parameter value | 1 byte | Environment characteristic used for selecting an SE |

Step 290: The NFC controller receives a routing table sent by the device host.

After the DH on the local end sends the second configuration instruction, the DH on the local end further generates a routing table according to the characteristic information about the use of the SE by the user. The NFC controller on the local end receives the routing table, where the routing table is used by the NFC controller on the local end to select an SE according to the routing table in a process of interaction with the peer end, where the SE matches an environment characteristic supported by the peer end and a type identifier included in a selection instruction sent by the peer end. It is exemplary but not limited to that Table 4 shows a routing table.

TABLE 4

| Routing table | | | | | | | | |
|---|---|---|---|---|---|---|---|---|
| 1. Environment characteristic used by the NFC controller to select the SE | | | | | | | | |
| DH shutdown of a local end | DH startup of a local end | Power-off | Location branch 1 | Location branch 2 | Location branch 3 | Time branch 1 | Time branch 2 | Time branch 3 |
| 2. AID-based routing | | | | | | | | |
| AID1 ENV | ENV | ENV | SE1' | SE2 | Empty | SE3' | SE4 | Empty |

Referring to Table 4, the routing table shown in Table 4 shows only AID-based route selection. Depending on actual conditions, protocol-based route selection and NFC technology type-based route selection may exist. Information corresponding to DH shutdown of the local end, DH startup of the local end, and power-off is "ENV", indicating that selection of the SE is determined according to a subsequent environment characteristic. Further, when the SE is selected according to the environment characteristic, the selection may be performed after corresponding determining is performed according to conditions and the number of branches. It is exemplary but not limited to that Table 5 shows an environment characteristic determining table. The embodiment of the present invention is described by using an example in which each of the location attribute and the time attribute shown in Table 4 has two branches.

TABLE 5

Environment characteristic determining table

| Attribute | Branch | Operator for determining | Value for determining |
|---|---|---|---|
| Location | 1 | Equal to | Coordinates of the location A |
| Location | 2 | Equal to | Coordinates of the location B |
| Time | 1 | Less than | 6 |
| Time | 2 | Greater than or equal to | 6 |

As shown in Table 5, it is determined from Table 4 that the environment characteristic used by the NFC controller on the local end to select an SE includes the location attribute and the time attribute. According to the type identifier in the selection instruction sent by the peer end, a record corresponding to the type identifier, such as an AID1 record, is selected from the routing table. According to the AID1 record, it is determined that the SE to be selected is determined according to the subsequent environment characteristic. Therefore, the NFC controller on the local end uses the environment characteristic supported by the peer end. In an example, the environment characteristic supported by the peer end includes the location attribute and the time attribute, and the location attribute has definite coordinate values (x, y). Therefore, the NFC controller on the local end uses Table 5 to determine whether the coordinate values are equal to coordinates of the location A or coordinates of the location B. If the coordinate values are equal to the coordinates of the location A, it is determined that the location branch 1 is selected, and an SE corresponding to the location branch 1, which is selected with reference to Table 4, is SE1'. After selecting the SE1', the NFC on the local end obtains interaction data in the SE1', and sends the interaction data to the peer end, so as to complete interaction with the peer end.

The NFC controller on the local end receives the routing table sent by the DH on the local end, and the NFC controller on the local end selects the corresponding SE according to the received routing table in the process of interaction with the peer end.

Therefore, by applying a configuration method for implementing selection of a secure element in NFC according to an embodiment of the present invention, an NFC controller on a local end receives a configuration instruction sent by a DH on the local end, where the configuration instruction includes an environment characteristic used for selecting an SE; and configures the environment characteristic, which is used for selecting the SE, in an attribute response instruction for communicating and interacting with a peer end. This solves a problem in the solution of the prior art that an SE can be selected only by using characteristics of NFC communication that are obtained by the NFC controller. In addition, based on the foregoing method, when communication and interaction are performed with the peer end subsequently, the NFC controller on the local end can select an SE according to a configured environment characteristic regardless of whether the DH on the local end is started or shut down, thereby improving practicality of the prior art.

Embodiment 3

Figure 3:
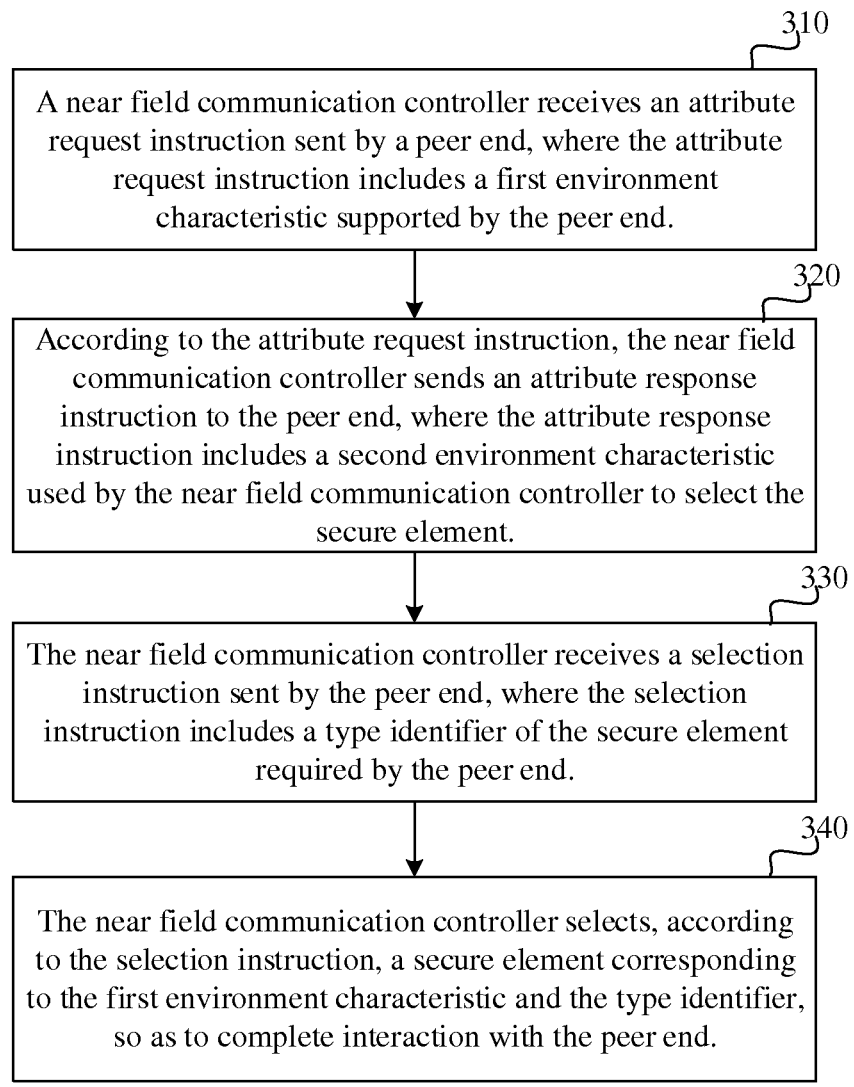
FIG. 3 is a flowchart of an interaction method for implementing selection of a secure element in NFC according to Embodiment 3 of the present invention.

After a configuration process described in Embodiment 2, a process of interaction between a mobile terminal and a POS machine is further included. The interaction process provided in this embodiment of the present invention is based on a configuration process described in the foregoing Embodiment 1, and the interaction process provided in this embodiment of the present invention is applicable to both a case in which a DH on a local end is started and a case in which the DH on the local end is shut down. In both the case in which the DH on the local end is started and the case in which the DH on the local end is shut down, an NFC controller on the local end may select a corresponding SE according to a routing table, thereby compensating for limitations of the solution in the prior art and also improving practicality of the prior art. As shown in FIG. 3, the following steps are included.

In the embodiment of the present invention, an interaction method for implementing selection of a secure element in NFC is described by using an example in which a mobile terminal serves as a local end and a POS machine serves as a peer end.

Step 310: An NFC controller receives an attribute request instruction sent by the peer end, where the attribute request instruction includes a first environment characteristic supported by the peer end.

The NFC controller on the local end receives the attribute request instruction sent by the peer end, where the attribute request instruction includes the first environment characteristic supported by the NFC controller on the peer end.

It is exemplary but not limited to that the attribute request instruction may be an ATTRBIT REQUEST instruction.

Step 320: According to the attribute request instruction, the NFC controller sends an attribute response instruction to the peer end, where the attribute response instruction includes a second environment characteristic used by the NFC controller to select the secure element.

After receiving the attribute request instruction, the NFC controller on the local end parses the attribute request instruction and extracts the first environment characteristic included in the instruction, and learns that the peer end has sent the supported environment characteristic. The NFC controller on the local end sends the attribute response instruction to the peer end, where the attribute response instruction includes the second environment characteristic used by the local NFC controller to select the SE. In the embodiment of the present invention, the attribute response instruction is the attribute response instruction that is configured by the NFC controller on the local end in Embodiment 1.

It is exemplary but not limited to that the attribute response instruction may be an ATTRBIT RESPONSE instruction.

Step 330: The NFC controller receives a selection instruction sent by the peer end, where the selection instruction includes a type identifier of a secure element required by the peer end.

The NFC controller on the local end receives the selection instruction sent by the peer end, where the selection instruction includes the type identifier of the SE required by the peer end.

Further, the type identifier of the SE is a type identifier used for distinguishing interaction data in the SE. For example, an SE stores interaction data related to a bank card, and therefore the type identifier of the SE is D156000001ED/EP; and another SE stores interaction data related to a public transport card, and therefore the type identifier of the SE is D15600XXXX0XGONGJIAO.

It is exemplary but not limited to that the selection instruction may be a SELECT instruction.

Step 340: The NFC controller selects, according to the selection instruction, a secure element corresponding to the first environment characteristic and the type identifier, so as to complete interaction with the peer end.

After receiving the selection instruction, the NFC controller on the local end parses and extracts content carried in the selection instruction, selects an SE corresponding to the first environment characteristic and the type identifier from multiple SEs on the local end, and sends a selection instruction to the selected SE. After receiving the selection instruction, the selected SE feeds back interaction data stored in the selected SE to the NFC controller on the local end. The NFC controller on the local end obtains the interaction data in the SE.

After obtaining the interaction data in the selected SE, the NFC on the local end sends the interaction data to the NFC controller on the peer end. After receiving the interaction data, the NFC on the peer end uses the interaction data to complete the corresponding interaction.

Therefore, by applying an interaction method for implementing selection of a secure element in NFC according to an embodiment of the present invention, because an NFC controller in a mobile terminal has completed corresponding configuration previously, a problem in the solution of the prior art is solved in subsequent interaction with a POS machine, where the problem is that an SE can be selected only by using characteristics of NFC communication that are obtained by the NFC controller in the mobile terminal. In addition, based on the foregoing method, when communication and interaction are performed with the peer end subsequently, the NFC controller in the mobile terminal can select an SE according to a configured environment characteristic regardless of whether a DH in the mobile terminal is started or shut down, thereby improving practicality of the prior art.

Embodiment 4

Figure 4:
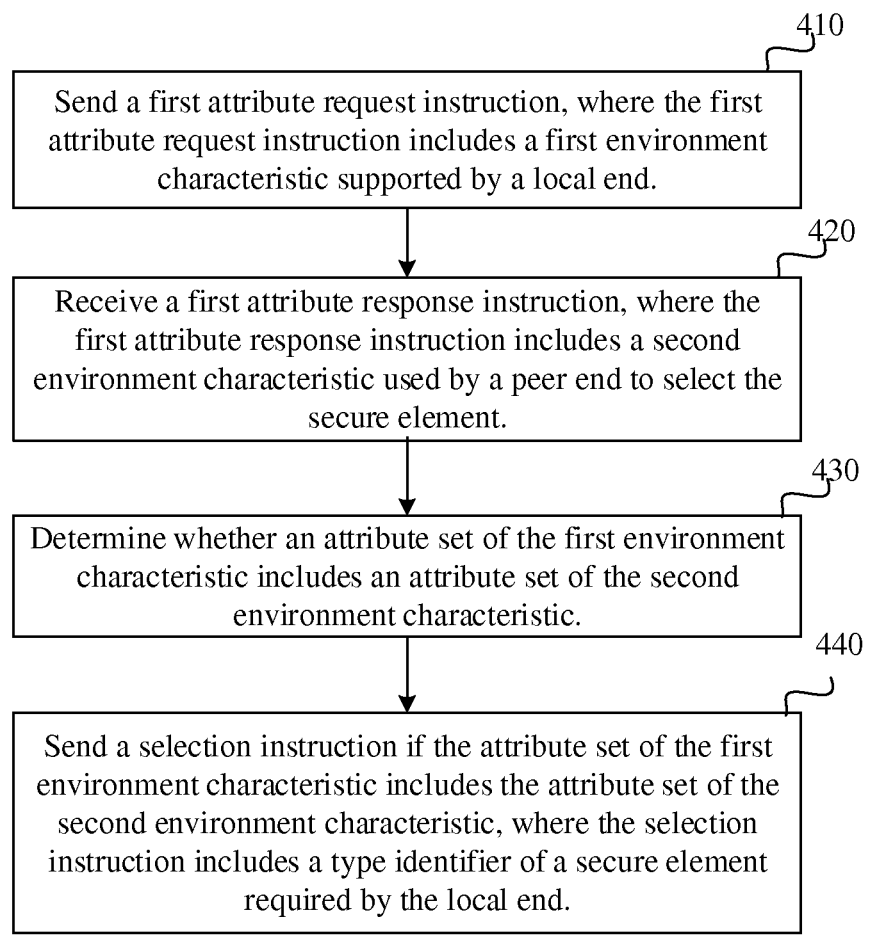
FIG. 4 is a flowchart of an interaction method for implementing selection of a secure element in NFC according to Embodiment 4 of the present invention.

In the interaction process described in the previous embodiment, an interaction method for implementing selection of a secure element in NFC is described by using an example in which a mobile terminal serves as a local end and a POS machine serves as a peer end. In this embodiment of the present invention, an interaction method for implementing selection of a secure element in NFC is described by using an NFC controller in the POS machine as an implementation entity. As shown in FIG. 4, the following steps are included.

In the embodiment of the present invention, the interaction method for implementing selection of a secure element in NFC is described by using an example in which a POS machine serves as a local end and a mobile terminal serves as a peer end.

Step 410: Send a first attribute request instruction, where the first attribute request instruction includes a first environment characteristic supported by the local end.

An NFC controller on the local end sends the first attribute request instruction to the peer end, where the first attribute request instruction includes the first environment characteristic supported by the NFC controller on the local end.

It is exemplary but not limited to that the first attribute request instruction may be an ATTRBIT REQUEST instruction.

Step 420: Receive a first attribute response instruction, where the first attribute response instruction includes a second environment characteristic used by the peer end to select the secure element.

After receiving the first attribute request instruction, the peer end determines that the NFC controller on the local end has sent the supported environment characteristic. The peer end sends the first attribute response instruction to the NFC controller on the local end, where the first attribute response instruction includes the second environment characteristic used by the peer end to select the SE.

It is exemplary but not limited to that the first attribute response instruction may be an ATTRBIT RESPONSE instruction.

Step 430: Determine whether an attribute set of the first environment characteristic includes an attribute set of the second environment characteristic.

After receiving the first attribute response instruction, the NFC controller on the local end parses the first attribute response instruction and extracts the carried second environment characteristic, and parses the second environment characteristic and extracts carried content, and the NFC controller on the local end determines whether the attribute set of the first environment characteristic includes the attribute set of the second environment characteristic.

Step 440: Send a selection instruction if the attribute set of the first environment characteristic includes the attribute set of the second environment characteristic, where the selection instruction includes a type identifier of a secure element required by the local end.

The NFC controller on the local end determines whether the attribute set of the first environment characteristic includes the attribute set of the second environment characteristic. If the attribute set of the first environment characteristic includes the attribute set of the second environment characteristic, the NFC controller on the local end sends the selection instruction to the peer end, where the selection instruction includes the type identifier of the SE required by the NFC controller on the local end, and the type identifier of the SE is used by the peer end to select an SE corresponding to the first environment characteristic and the type identifier and obtain interaction data from the SE, so as to complete a process of interaction with the NFC controller on the local end.

In the embodiment of the present invention, that the attribute set of the first environment characteristic includes the attribute set of the second environment characteristic is that the attribute set of the first environment characteristic is greater than or equal to the attribute set of the second environment characteristic. If the attribute set of the first environment characteristic is greater than or equal to the attribute set of the second environment characteristic, the NFC controller on the local end sends the selection instruction to the peer end.

It is exemplary but not limited to that the selection instruction may be a SELECT instruction.

Therefore, by applying an interaction method for implementing selection of a secure element in NFC according to an embodiment of the present invention, because an NFC controller in a mobile terminal has completed corresponding configuration previously, the NFC controller in the mobile terminal can select an SE according to previous corresponding configuration in a process of interaction between an NFC controller in a POS machine and the mobile terminal, so as to complete subsequent interaction. In addition, based on the foregoing method, when communication and interaction are performed with the peer end subsequently, the NFC controller in the mobile terminal can select an SE according to a configured environment characteristic regardless of whether a DH in the mobile terminal is started or shut down, thereby improving practicality of the prior art.

Embodiment 5

To make the objectives, technical solutions, and advantages of the present invention clearer, the following further describes the embodiments of the present invention in detail with reference to the accompanying drawings.

Figure 5:
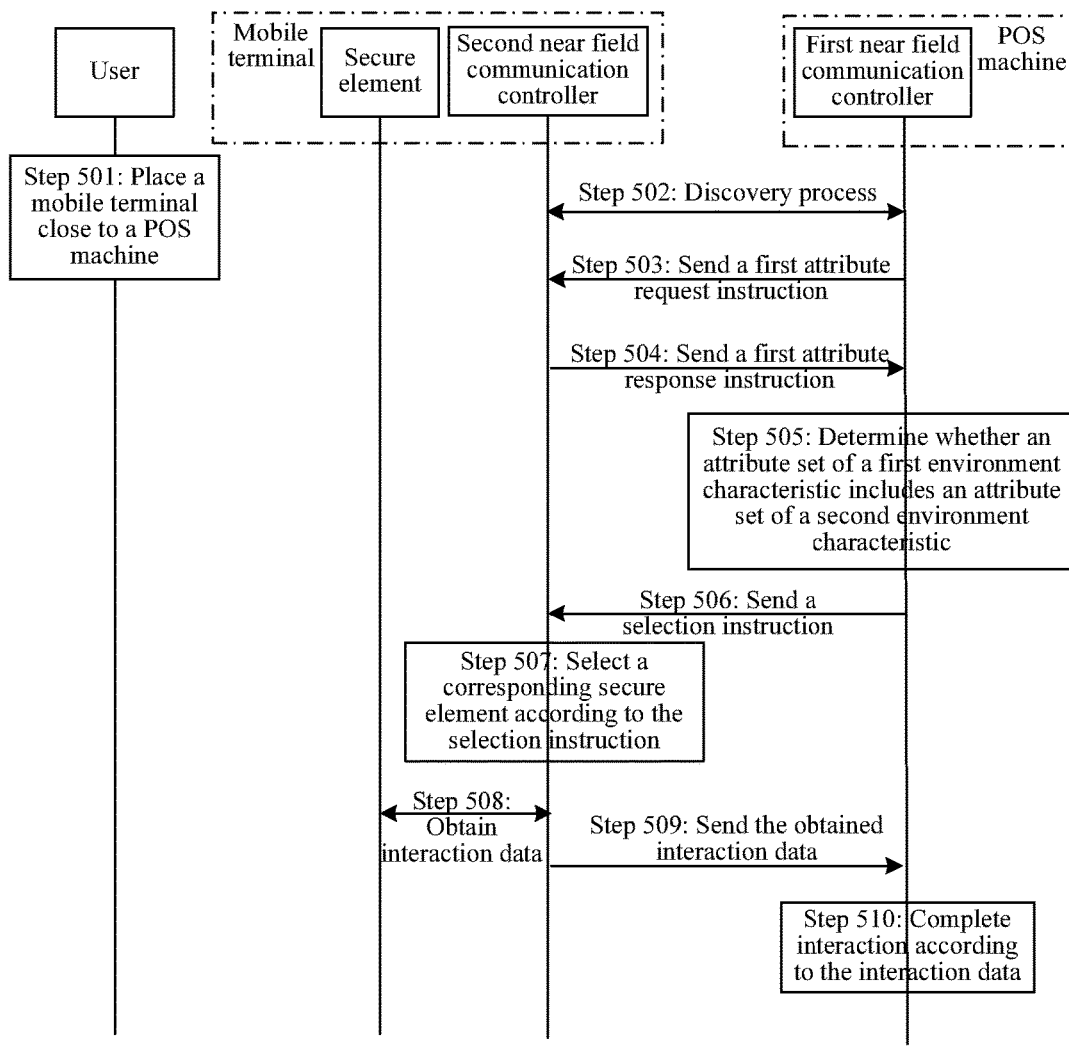
FIG. 5 is a signaling diagram of an interaction method for implementing selection of a secure element in NFC according to Embodiment 5 of the present invention.

By using FIG. 5 as an example, the following describes an interaction method for implementing selection of a secure element in NFC according to an embodiment of the present invention. FIG. 5 is a signaling diagram of an interaction method for implementing selection of a secure element in NFC according to Embodiment 5 of the present invention. The embodiment of the present invention describes a process of interaction between a mobile terminal and a POS machine by using an example in which a DH in the mobile terminal is shut down. As shown in FIG. 5, the mobile terminal and the POS machine also form a system for implementing selection of a secure element in NFC. This embodiment includes the following steps.

Step 501: A user places the mobile terminal close to the POS machine.

The user expects to perform communication and interaction with the POS machine by using the mobile terminal, and the user places the mobile terminal close to the POS machine.

Before the user places the mobile terminal close to the POS machine, a first NFC controller also performs corresponding configuration so that the first NFC controller determines a supported environment characteristic.

The first NFC controller receives a configuration instruction sent by a DH in the POS machine, where the configuration instruction includes the environment characteristic supported by the first NFC controller. The first NFC controller configures the environment characteristic in an instruction of performing communication and interaction with a second NFC controller.

Further, a format of the configuration instruction in the embodiment of the present invention is the same as a format of the second configuration instruction shown in Table 3, but parameter values in the configuration instruction use attribute values shown in Table 6. The attribute values shown in Table 6 are exemplary but are not construed as a limitation.

TABLE 6

| Attribute values | | |
|---|---|---|
| Type | Length | Attribute value |
| 1 (represents a location attribute) | x bytes | Location coordinate values (x, y) |
| 2 (represents a time attribute) | x bytes | Time value (hour; minute) |
| 3 (represents a POS machine attribute) | 1 byte | POS machine attribute |
| 4 (represents a limit attribute) | 1 byte | Limit of current interaction |

Step 502: A first NFC controller in the POS machine discovers a second NFC controller in the mobile terminal.

The POS machine is in a started state, the first NFC controller in the POS machine transmits a radio frequency field, and the user places the mobile terminal close to the POS machine. When it is ready to make a payment, the first NFC controller detects that the second NFC controller in the mobile terminal enters a radio frequency field range of the first NFC controller. When a DH in the mobile terminal is shut down, the radio frequency field transmitted by the first NFC controller can provide electric power for the second NFC controller, so that the second NFC can work normally. Radio frequency communication is enabled on both the first NFC controller and the second NFC controller.

Step 503: The first NFC controller sends a first attribute request instruction to the second NFC controller, where the first attribute request instruction includes a first environment characteristic supported by the first NFC controller.

Because the radio frequency field transmitted by the first NFC controller can provide electric power for the second NFC controller, the second NFC controller can work normally. The first NFC controller sends the first attribute request instruction to the second NFC controller, where the first attribute request instruction includes the first environment characteristic supported by the first NFC controller.

The first environment characteristic carries a combination of one or more of the following attributes: a location attribute, a limit attribute, a time attribute, and a POS machine identifier. For example, in the embodiment of the present invention, the first environment characteristic supported by the first NFC controller is the location attribute and the time attribute. Further, the location attribute and the time attribute correspond to specific attribute values. For example, the attribute value corresponding to the location attribute is coordinate values (x, y) of the POS machine, and the attribute value corresponding to the time attribute is current time (specific hours and minutes).

It is exemplary but not limited to that the first attribute request instruction may be an ATTRBIT REQUEST instruction.

Step 504: The second NFC controller sends a first attribute response instruction to the first NFC controller, where the first attribute response instruction includes a second environment characteristic used by the second NFC controller to select the secure element.

After receiving the first attribute request instruction, the second NFC controller determines that the second NFC controller has sent the supported environment characteristic. The second NFC controller sends the first attribute response instruction to the first NFC controller, where the first attribute response instruction includes the second environment characteristic used by the second NFC controller to select the SE. In the embodiment of the present invention, the first attribute response instruction is the attribute response instruction that is configured by the second NFC controller in Embodiment 1.

The second environment characteristic carries a combination of one or more of the following attributes: the location attribute, the limit attribute, the time attribute, and a POS machine attribute. For example, in the embodiment of the present invention, the second environment characteristic used by the second NFC controller to select the SE is the location attribute and the time attribute.

It is exemplary but not limited to that the first attribute response instruction may be an ATTRBIT RESPONSE instruction.

Step 505: The second NFC controller determines whether an attribute set of the first environment characteristic includes an attribute set of the second environment characteristic.

After receiving the first attribute response instruction, the first NFC controller parses the first attribute response instruction and extracts the carried second environment characteristic, and parses the second environment characteristic and extracts carried content, and the first NFC controller determines whether the attribute set of the first environment characteristic includes the attribute set of the second environment characteristic.

Further, in the embodiment of the present invention, the attribute set of the first environment characteristic includes the attribute set of the second environment characteristic is that the attribute set of the first environment characteristic is greater than or equal to the attribute set of the second environment characteristic. If the attribute set of the first environment characteristic includes the attribute set of the second environment characteristic, step 506 is performed; otherwise, step 511 is performed.

In an example, as described in the previous example, the attribute set of the first environment characteristic is the location attribute and the time attribute, and the attribute set of the second environment characteristic is the location attribute and the time attribute. Therefore, the first NFC controller determines that the attribute set of the first environment characteristic includes the attribute set of the second environment characteristic, and step 506 is performed.

In another example, the attribute set of the first environment characteristic is the location attribute, the time attribute, and the limit attribute, and the attribute set of the second environment characteristic is the location attribute and the time attribute. Therefore, the first NFC controller determines that the attribute set of the first environment characteristic includes the attribute set of the second environment characteristic, and step 506 is performed.

In another example, the attribute set of the first environment characteristic is the location attribute, and the attribute set of the second environment characteristic is the location attribute and the time attribute. Therefore, the first NFC controller determines that the attribute set of the first environment characteristic excludes (that is, is less than) the attribute set of the second environment characteristic, and step 511 is performed.

Step 506: The first NFC controller sends a selection instruction if the attribute set of the first environment characteristic includes the attribute set of the second environment characteristic, where the selection instruction includes a type identifier of a secure element required by the first NFC controller.

If the attribute set of the first environment characteristic includes the attribute set of the second environment characteristic, the first NFC controller sends the selection instruction to the second NFC controller, where the selection instruction includes the type identifier of the SE required by the first NFC controller, and is used by the second NFC controller to select an SE corresponding to the first environment characteristic and the type identifier in a subsequent step.

The type identifier of the SE is a type identifier used for distinguishing interaction data in the SE. For example, an SE stores interaction data related to a bank card, and therefore the type identifier of the SE is D156000001ED/EP; another SE stores interaction data related to a public transport card, and therefore the type identifier of the SE is D1560XXXX0XGONGJIAO.

It is exemplary but not limited to that the selection instruction may be a SELECT instruction.

Step 507: The second NFC controller selects a secure element corresponding to the first environment characteristic and the type identifier according to the selection instruction.

After receiving the selection instruction, the first NFC controller parses and extracts content carried in the selection instruction, and selects the SE corresponding to the first environment characteristic and the type identifier from multiple SEs on a local end according to a routing table.

Step 508: The second NFC controller obtains interaction data from the selected secure element.

After selecting the SE corresponding to the first environment characteristic and the type identifier from the multiple SEs according to the routing table, the second NFC controller sends a selection instruction to the selected SE. After receiving the selection instruction, the selected SE feeds back the interaction data stored in the selected SE to the second NFC controller. The second NFC controller obtains the interaction data in the SE.

Step 509: The second NFC controller sends the obtained interaction data to the first NFC controller.

After obtaining the interaction data in the selected SE, the second NFC controller sends the interaction data to the first NFC controller.

Step 510: The first NFC controller completes interaction according to the interaction data.

After receiving the interaction data, the first NFC completes the corresponding interaction by using the interaction data.

Step 511: If the attribute set of the first environment characteristic excludes the attribute set of the second environment characteristic, the first NFC controller obtains a third environment characteristic, where the third environment characteristic includes an attribute set that is not included in the first environment characteristic but is included in the second environment characteristic.

If the attribute set of the first environment characteristic excludes the attribute set of the second environment characteristic, the first NFC controller obtains the third environment characteristic, where the third environment characteristic includes an attribute set that is not included in the first environment characteristic but is included in the second environment characteristic.

In an example, the attribute set of the first environment characteristic is the location attribute, and the attribute set of the second environment characteristic is the location attribute and the time attribute. Therefore, the first NFC controller determines that the attribute set of the first environment characteristic excludes (that is, is less than) the attribute set of the second environment characteristic, and the first NFC obtains content that is not included (that is, the first NFC controller obtains the time attribute).

The first NFC controller may obtain the time attribute by using its own sensor.

Step 512: The first NFC controller sends a second attribute request instruction, where the second attribute request instruction includes the third environment characteristic.

After obtaining the time attribute, the first NFC controller sends the second attribute request instruction to the second NFC controller. According to the second attribute request instruction, the second NFC controller sends a second attribute response instruction to the first NFC controller, where the second attribute response instruction includes the second environment characteristic used by the second NFC controller to select the SE. The first NFC controller continues to determine whether the attribute set of the first environment characteristic and the third environment characteristic includes the attribute set of the second environment characteristic.

When the attribute set of the first environment characteristic and the third environment characteristic includes the attribute set of the second environment characteristic, the second NFC controller receives the selection instruction sent by the first NFC controller.

When the attribute set of the first environment characteristic and the third environment characteristic excludes the attribute set of the second environment characteristic, the second NFC controller still receives a selection instruction sent by the first NFC controller.

It should be noted that FIG. 5 does not show step 511 and step 512.

Therefore, by applying an interaction method for implementing selection of a secure element in NFC according to an embodiment of the present invention, because an NFC controller in a mobile terminal has completed corresponding configuration previously, a problem in the solution of the prior art is solved in subsequent interaction with a POS machine, where the problem is that an SE can be selected only by using characteristics of NFC communication that are obtained by the NFC controller in the mobile terminal, and some security risks exist when the SE selected by the NFC controller in the mobile terminal makes a payment with the corresponding POS machine. In addition, based on the foregoing method, when communication and interaction are performed with the peer end subsequently, the NFC controller in the mobile terminal can select an SE according to a configured environment characteristic regardless of whether a DH in the mobile terminal is started or shut down, thereby improving practicality of the prior art.

Embodiment 6

Figure 6:
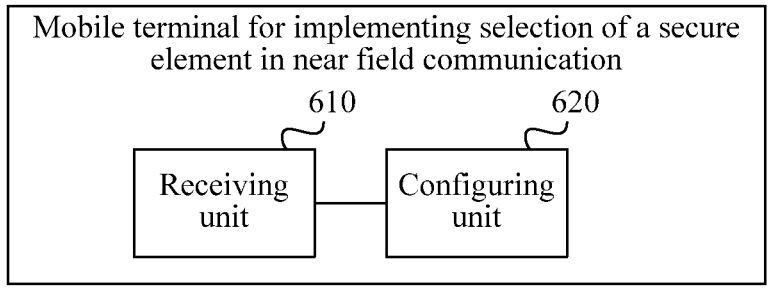
FIG. 6 is a schematic structural diagram of a mobile terminal for implementing selection of a secure element in NFC according to Embodiment 6 of the present invention.

Correspondingly, Embodiment 6 of the present invention further provides a mobile terminal for implementing selection of a secure element in NFC to implement the method in the foregoing embodiment. As shown in FIG. 6, the mobile terminal includes a receiving unit 610 and a configuring unit 620.

The receiving unit 610 in the apparatus is configured to receive a first configuration instruction sent by a device host on a local end, where the first configuration instruction includes an environment characteristic used for selecting the secure element.

The configuring unit 620 is configured to configure the environment characteristic in an NFC controller according to the first configuration instruction.

The receiving unit 610 is further configured to receive a second configuration instruction sent by the device host.

The configuring unit 620 is further configured to, according to the second configuration instruction, configure the environment characteristic in an attribute response instruction for communicating and interacting with a peer end, so as to continue communicating and interacting with the peer end according to the configured attribute response instruction and further complete the selection of the secure element.

The receiving unit 610 is further configured to receive a routing table generated by the device host according to the environment characteristic.

The receiving unit 610 and the configuring unit 620 may be used to implement the method described in Embodiment 1. For details, refer to the description of the method in Embodiment 1, and the details are not described herein again.

The environment characteristic received by the receiving unit 610 includes a set of one or more of the following attributes: a location attribute, a limit attribute, a time attribute, and a POS machine attribute.

When the environment characteristic includes the limit attribute, after the device host instructs a first secure element corresponding to the limit attribute to separate a second secure element from the first secure element, the receiving unit 610 is further configured to receive a registration command sent by the second secure element.

Therefore, by applying a mobile terminal for implementing selection of a secure element in NFC according to an embodiment of the present invention, an NFC controller on a local end receives a configuration instruction sent by a DH on the local end, where the configuration instruction includes an environment characteristic used for selecting an SE; and configures the environment characteristic, which is used for selecting the SE, in an attribute response instruction for communicating and interacting with a peer end. This solves a problem in the solution of the prior art that an SE can be selected only by using characteristics of NFC communication that are obtained by the NFC controller. In addition, based on the foregoing method, when communication and interaction are performed with the peer end subsequently, the NFC controller on the local end can select an SE according to a configured environment characteristic regardless of whether the DH on the local end is started or shut down, thereby improving practicality of the prior art.

Embodiment 7

Figure 7:
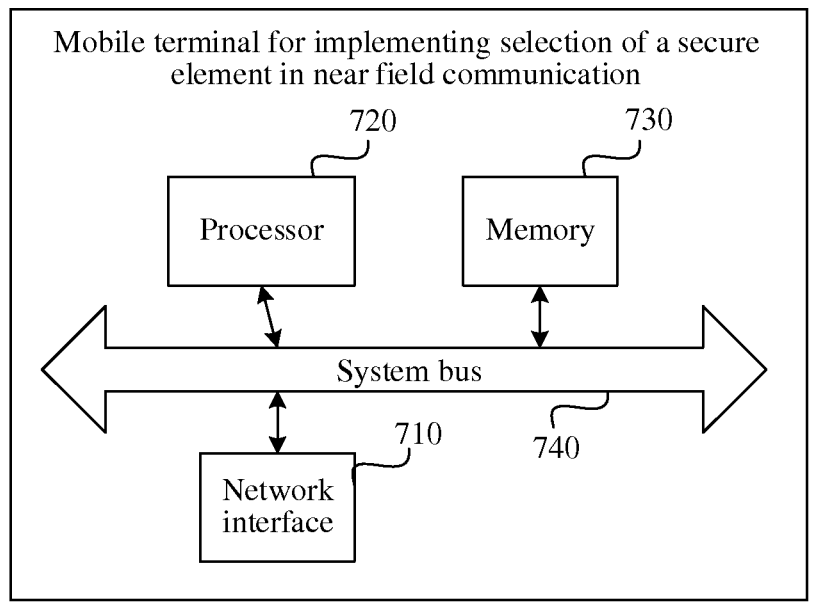
FIG. 7 is a schematic structural diagram of a mobile terminal for implementing selection of a secure element in NFC according to Embodiment 7 of the present invention.

In addition, a mobile terminal for implementing selection of a secure element in NFC according to Embodiment 7 of the present invention may also be implemented in the following manner, so as to implement the method in the foregoing embodiment. As shown in FIG. 7, the mobile terminal includes a network interface 710, a processor 720, and a memory 730. A system bus 740 is configured to connect the network interface 710, the processor 720, and the memory 730.

The network interface 710 is configured to communicate with an NFC controller in a POS machine.

The memory 730 may be a permanent memory such as a hard disk drive and a flash memory, and the memory 730 includes a software module and a device driver. The software module may be any type of function module capable of implementing the foregoing method of the present invention, and the device driver may be a network and interface driver.

When being started, such software components are loaded to the memory 730, and then are accessed by the processor 720 to execute the following instructions: receiving a first configuration instruction sent by a device host on a local end, where the first configuration instruction includes an environment characteristic used for selecting the secure element; configuring the environment characteristic in itself according to the first configuration instruction; receiving a second configuration instruction sent by the device host; and configuring, according to the second configuration instruction, the environment characteristic in an attribute response instruction for communicating and interacting with a peer end, so as to continue communicating and interacting with the peer end according to the configured attribute response instruction and further complete the selection of the secure element.

The network interface 710, the processor 720, the memory 730, and the system bus 740 may be used to implement the method described in Embodiment 1. For details, refer to the description of the method in Embodiment 1, and the details are not described herein again.

Further, after accessing the software components of the memory 730, the processor executes instructions in the following process: receiving a routing table generated by the device host according to the environment characteristic.

Further, the environment characteristic includes a set of one or more of the following attributes: a location attribute, a limit attribute, a time attribute, and a POS machine attribute.

Further, after accessing the software components of the memory 730, the processor executes instructions in the following process: instructing, by the device host, a first secure element corresponding to the limit attribute to separate a second secure element from the first secure element; and receiving a registration command sent by the second secure element.

Therefore, by applying a configuration mobile terminal for implementing selection of a secure element in NFC according to an embodiment of the present invention, an NFC controller on a local end receives a configuration instruction sent by a DH on the local end, where the configuration instruction includes an environment characteristic used for selecting an SE; and configures the environment characteristic, which is used for selecting the SE, in an attribute response instruction for communicating and interacting with a peer end. This solves a problem in the solution of the prior art that an SE can be selected only by using characteristics of NFC communication that are obtained by the NFC controller. In addition, based on the foregoing method, when communication and interaction are performed with the peer end subsequently, the NFC controller on the local end can select an SE according to a configured environment characteristic regardless of whether the DH on the local end is started or shut down, thereby improving practicality of the prior art.

Embodiment 8

Figure 8:
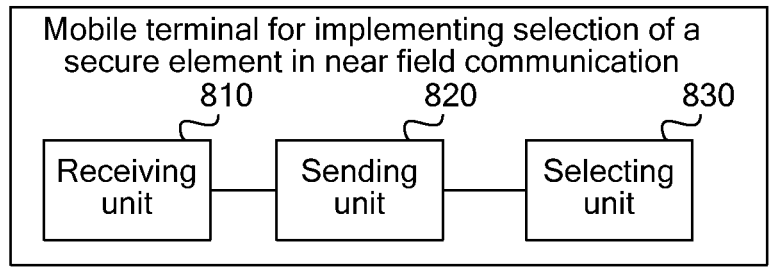
FIG. 8 is a schematic structural diagram of a mobile terminal for implementing selection of a secure element in NFC according to Embodiment 8 of the present invention.

Correspondingly, Embodiment 8 of the present invention further provides a mobile terminal for implementing selection of a secure element in NFC to implement the method in the foregoing embodiment. As shown in FIG. 8, the mobile terminal includes a receiving unit 810, a sending unit 820, and a selecting unit 830.

The receiving unit 810 in the mobile terminal is configured to receive an attribute request instruction sent by a peer end, where the attribute request instruction includes a first environment characteristic supported by the peer end.

The sending unit 820 is configured to, according to the attribute request instruction, send an attribute response instruction to the peer end, where the attribute response instruction includes a second environment characteristic used by the mobile terminal to select the secure element.

The receiving unit 810 is further configured to receive a selection instruction sent by the peer end, where the selection instruction includes a type identifier of the secure element required by the peer end.

The selecting unit 830 is configured to select, according to the selection instruction, a secure element corresponding to the first environment characteristic and the type identifier, so as to complete interaction with the peer end.

The receiving unit 810, the sending unit 820, and the selecting unit 830 may be used to implement the method described in Embodiment 3. For details, refer to the description of the method in Embodiment 3, and the details are not described herein again.

The selecting unit 830 is configured to select, according to a routing table, the secure element corresponding to the first environment characteristic and the type identifier.

Therefore, by applying a mobile terminal for implementing selection of a secure element in NFC according to an embodiment of the present invention, because an NFC controller in the mobile terminal has completed corresponding configuration previously, a problem in the solution of the prior art is solved in subsequent interaction with a POS machine, where the problem is that an SE can be selected only by using characteristics of NFC communication that are obtained by the NFC controller in the mobile terminal. In addition, based on the foregoing method, when communication and interaction are performed with the peer end subsequently, the NFC controller in the mobile terminal can select an SE according to a configured environment characteristic regardless of whether a DH in the mobile terminal is started or shut down, thereby improving practicality of the prior art.

Embodiment 9

Figure 9:
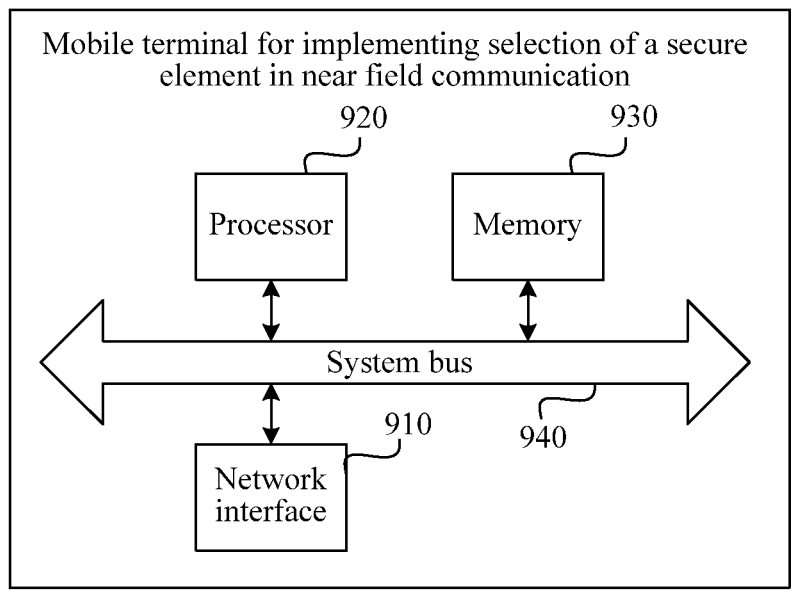
FIG. 9 is a schematic structural diagram of a mobile terminal for implementing selection of a secure element in NFC according to Embodiment 9 of the present invention.

In addition, the mobile terminal for implementing selection of a secure element in NFC according to Embodiment 8 of the present invention may also be implemented in the following manner, so as to implement the method in the foregoing embodiment. As shown in FIG. 9, the mobile terminal includes a network interface 910, a processor 920, and a memory 930. A system bus 940 is configured to connect the network interface 910, the processor 920, and the memory 930.

The network interface 910 is configured to communicate with an NFC controller in a POS machine.

The memory 930 may be a permanent memory such as a hard disk drive and a flash memory, and the memory 930 includes a software module and a device driver. The software module may be any type of function module capable of implementing the foregoing method of the present invention, and the device driver may be a network and interface driver.

When being started, such software components are loaded to the memory 930, and then are accessed by the processor 920 to execute the following instructions: receiving an attribute request instruction sent by a peer end, where the attribute request instruction includes a first environment characteristic supported by the peer end; sending, according to the attribute request instruction, an attribute response instruction to the peer end, where the attribute response instruction includes a second environment characteristic used by the mobile terminal to select the secure element; receiving a selection instruction sent by the peer end, where the selection instruction includes a type identifier of the secure element required by the peer end; and selecting, according to the selection instruction, a secure element corresponding to the first environment characteristic and the type identifier, so as to complete interaction with the peer end.

The network interface 910, the processor 920, the memory 930, and the system bus 940 may be used to implement the method described in Embodiment 3. For details, refer to the description of the method in Embodiment 3, and the details are not described herein again.

Further, after accessing the software components of the memory 930, the processor executes instructions in the following process: selecting, according to a routing table, the secure element corresponding to the first environment characteristic and the type identifier.

Therefore, by applying a mobile terminal for implementing selection of a secure element in NFC according to an embodiment of the present invention, because an NFC controller in the mobile terminal has completed corresponding configuration previously, a problem in the solution of the prior art is solved in subsequent interaction with a POS machine, where the problem is that an SE can be selected only by using characteristics of NFC communication that are obtained by the NFC controller in the mobile terminal. In addition, based on the foregoing method, when communication and interaction are performed with the peer end subsequently, the NFC controller in the mobile terminal can select an SE according to a configured environment characteristic regardless of whether a DH in the mobile terminal is started or shut down, thereby improving practicality of the prior art.

Embodiment 10

Figure 10:
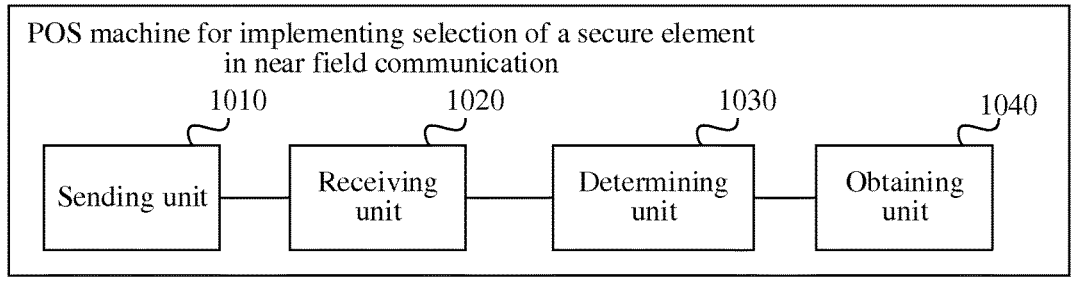
FIG. 10 is a schematic structural diagram of a POS machine for implementing selection of a secure element in NFC according to Embodiment 10 of the present invention.

Correspondingly, Embodiment 10 of the present invention further provides a POS machine for implementing selection of a secure element in NFC to implement the method in the foregoing embodiment. As shown in FIG. 10, the POS machine includes a sending unit 1010, a receiving unit 1020, and a determining unit 1030.

The sending unit 1010 in the POS machine is configured to send a first attribute request instruction, where the first attribute request instruction includes a first environment characteristic supported by a local end.

The receiving unit 1020 is configured to receive a first attribute response instruction, where the first attribute response instruction includes a second environment characteristic used by a peer end to select the secure element.

The determining unit 1030 is configured to determine whether an attribute set of the first environment characteristic includes an attribute set of the second environment characteristic.

The sending unit 1010 is further configured to send a selection instruction if the attribute set of the first environment characteristic includes the attribute set of the second environment characteristic, where the selection instruction includes a type identifier of the secure element required by the POS machine.

The sending unit 1010, the receiving unit 1020, and the determining unit 1030 may be used to implement the method described in Embodiment 4. For details, refer to the description of the method in Embodiment 4, and the details are not described herein again.

The POS machine further includes an obtaining unit 1040 configured to obtain a third environment characteristic if the attribute set of the first environment characteristic excludes the attribute set of the second environment characteristic, where the third environment characteristic includes an attribute set that is not included in the first environment characteristic and is included in the second environment characteristic.

The sending unit 1010 is further configured to send a second attribute request instruction, where the second attribute request instruction includes the third environment characteristic.

Therefore, by applying a POS machine for implementing selection of a secure element in NFC according to an embodiment of the present invention, because an NFC controller in a mobile terminal has completed corresponding configuration previously, the NFC controller in the mobile terminal can select an SE according to previous corresponding configuration in a process of interaction between an NFC controller in the POS machine and the mobile terminal, so as to complete subsequent interaction. In addition, based on the foregoing method, when communication and interaction are performed with the peer end subsequently, the NFC controller in the mobile terminal can select an SE according to a configured environment characteristic regardless of whether a DH in the mobile terminal is started or shut down, thereby improving practicality of the prior art.

Embodiment 11

Figure 11:
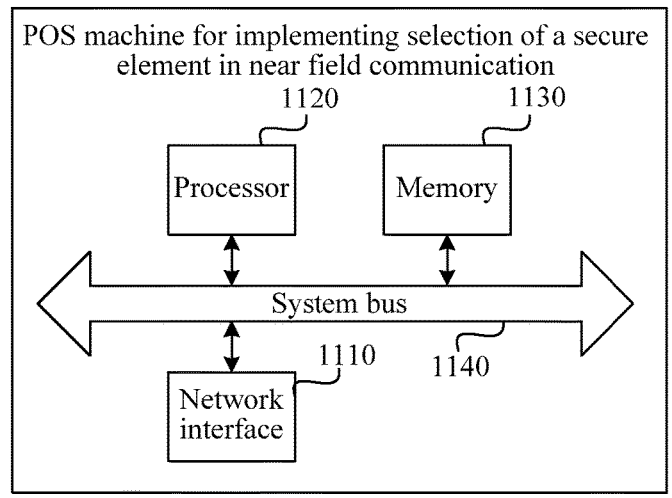
FIG. 11 is a schematic structural diagram of a POS machine for implementing selection of a secure element in NFC according to Embodiment 11 of the present invention.

In addition, the POS machine for implementing selection of a secure element in NFC according to Embodiment 10 of the present invention may also be implemented in the following manner, so as to implement the method in the foregoing embodiment. As shown in FIG. 11, the POS machine includes a network interface 1110, a processor 1120, and a memory 1130. A system bus 1140 is configured to connect the network interface 1110, the processor 1120, and the memory 1130.

The network interface 1110 is configured to communicate with an NFC controller in a mobile terminal.

The memory 1130 may be a permanent memory such as a hard disk drive and a flash memory, and the memory 1130 includes a software module and a device driver. The software module may be any type of function module capable of implementing the foregoing method of the present invention, and the device driver may be a network and interface driver.

When being started, such software components are loaded to the memory 1130, and then are accessed by the processor 1120 to execute the following instructions: sending a first attribute request instruction, where the first attribute request instruction includes a first environment characteristic supported by a local end; receiving a first attribute response instruction, where the first attribute response instruction includes a second environment characteristic used by a peer end to select the secure element; determining whether an attribute set of the first environment characteristic includes an attribute set of the second environment characteristic; and sending a selection instruction if the attribute set of the first environment characteristic includes the attribute set of the second environment characteristic, where the selection instruction includes a type identifier of the secure element required by the POS machine.

The network interface 1110, the processor 1120, the memory 1130, and the system bus 1140 may be used to implement the method described in Embodiment 4. For details, refer to the description of the method in Embodiment 4, and the details are not described herein again.

Further, after accessing the software components of the memory 1130, the processor executes instructions in the following process: obtaining a third environment characteristic if the attribute set of the first environment characteristic excludes the attribute set of the second environment characteristic, where the third environment characteristic includes an attribute set that is not included in the first environment characteristic and is included in the second environment characteristic; and sending a second attribute request instruction, where the second attribute request instruction includes the third environment characteristic.

Therefore, by applying a POS machine for implementing selection of a secure element in NFC according to an embodiment of the present invention, because an NFC controller in a mobile terminal has completed corresponding configuration previously, the NFC controller in the mobile terminal can select an SE according to previous corresponding configuration in a process of interaction between an NFC controller in the POS machine and the mobile terminal, so as to complete subsequent interaction. In addition, based on the foregoing method, when communication and interaction are performed with the peer end subsequently, the NFC controller in the mobile terminal can select an SE according to a configured environment characteristic regardless of whether a DH in the mobile terminal is started or shut down, thereby improving practicality of the prior art.

Embodiment 12

Figure 12:
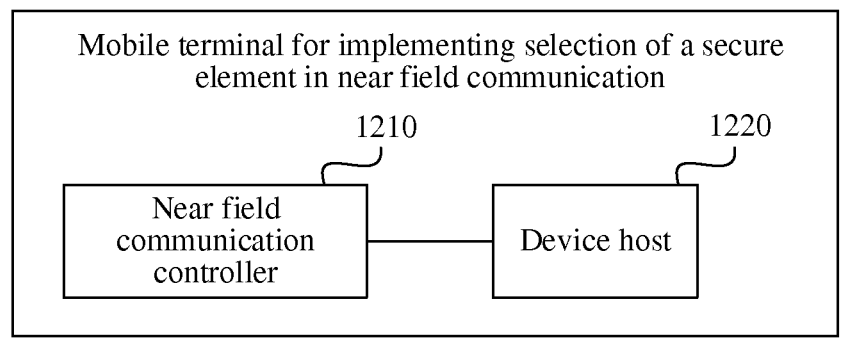
FIG. 12 is a schematic structural diagram of a mobile terminal for implementing selection of a secure element in NFC according to Embodiment 12 of the present invention.

In addition, the mobile terminal for implementing selection of a secure element in NFC according to Embodiment 7 of the present invention may also be implemented in the following manner, so as to implement the method in the foregoing embodiment. As shown in FIG. 12, the mobile terminal includes an NFC controller 1210 and a device host 1220.

The device host 1220 is configured to send a first configuration instruction, where the first configuration instruction includes an environment characteristic used for selecting the secure element.

The NFC controller 1210 is configured to receive the first configuration instruction and configure the environment characteristic according to the first configuration instruction.

The device host 1220 is further configured to send a second configuration instruction.

The NFC controller 1210 is further configured to receive the second configuration instruction, and configure, according to the second configuration instruction, the environment characteristic in an attribute response instruction for communicating and interacting with a peer end, so as to continue communicating and interacting with the peer end according to the configured attribute response instruction and further complete the selection of the secure element.

The NFC controller 1210 and the device host 1220 may be used to implement the method described in Embodiment 1. For details, refer to the description of the method in Embodiment 1, and the details are not described herein again. Therefore, by applying a mobile terminal for implementing selection of a secure element in NFC according to an embodiment of the present invention, an NFC controller on a local end receives a configuration instruction sent by a DH on the local end, where the configuration instruction includes an environment characteristic used for selecting an SE; and configures the environment characteristic, which is used for selecting the SE, in an attribute response instruction for communicating and interacting with a peer end. This solves a problem in the solution of the prior art that an SE can be selected only by using characteristics of NFC communication that are obtained by the NFC controller. In addition, based on the foregoing method, when communication and interaction are performed with the peer end subsequently, the NFC controller on the local end can select an SE according to a configured environment characteristic regardless of whether the DH on the local end is started or shut down, thereby improving practicality of the prior art.

A person skilled in the art may be further aware that, in combination with the examples described in the embodiments disclosed in this specification, units and algorithm steps may be implemented by electronic hardware, computer software, or a combination thereof. To clearly describe the interchangeability between the hardware and the software, the foregoing has generally described compositions and steps of each example according to functions. Whether the functions are performed by hardware or software depends on particular applications and design constraint conditions of the technical solutions. A person skilled in the art may use different methods to implement the described functions for each particular application, but it should not be considered that the implementation goes beyond the scope of the present invention.

Steps of methods or algorithms described in the embodiments disclosed in this specification may be implemented by hardware, a software module executed by a processor, or a combination thereof. The software module may reside in a random access memory (RAM), a memory, a read-only memory (ROM), an electrically programmable ROM, an electrically erasable programmable ROM, a register, a hard disk, a removable disk, a compact disc ROM (CD-ROM), or any other form of storage medium known in the art.

In the foregoing specific implementation manners, the objective, technical solutions, and benefits of the present invention are further described in detail. It should be understood that the foregoing descriptions are merely specific implementation manners of the present invention, but are not intended to limit the protection scope of the present invention. Any modification, equivalent replacement, or improvement made without departing from the spirit and principle of the present invention should fall within the protection scope of the present invention.

What is claimed is:

1. An interaction method for implementing selection of a secure element in near field communication, comprising:
   receiving, by a near field communication controller, an attribute request instruction from a peer end, wherein the attribute request instruction comprises a first environment characteristic supported by the peer end;
   sending, by the near field communication controller according to the attribute request instruction, an attribute response instruction to the peer end, wherein the attribute response instruction comprises a second environment characteristic used by the near field communication controller to select a secure element;
   receiving, by the near field communication controller, a selection instruction from the peer end, wherein the selection instruction comprises a type identifier of a secure element required by the peer end; and
   selecting, by the near field communication controller according to the selection instruction, a secure element corresponding to the first environment characteristic and the type identifier to complete interaction with the peer end.

2. The interaction method according to claim 1, wherein selecting, by the near field communication controller according to the selection instruction, the secure element corresponding to the first environment characteristic and the type identifier, comprises selecting, by the near field communication controller according to a routing table, the secure element corresponding to the first environment characteristic and the type identifier.

3. An interaction method for implementing selection of a secure element in near field communication, comprising:
   sending a first attribute request instruction, wherein the first attribute request instruction comprises a first environment characteristic supported by a local end;
   receiving a first attribute response instruction, wherein the first attribute response instruction comprises a second environment characteristic that is configured to be used by a peer end to select the secure element;
   determining whether an attribute set of the first environment characteristic comprises an attribute set of the second environment characteristic; and
   sending a selection instruction when the attribute set of the first environment characteristic comprises the attribute set of the second environment characteristic, wherein the selection instruction comprises a type identifier of a secure element required by the local end.

4. The method according to claim 3, wherein determining whether the attribute set of the first environment characteristic comprises the attribute set of the second environment characteristic further comprises:
   obtaining a third environment characteristic when the attribute set of the first environment characteristic excludes the attribute set of the second environment characteristic, wherein the third environment characteristic comprises an attribute set that is excluded from the first environment characteristic and is comprised in the second environment characteristic; and sending a second attribute request instruction, wherein the second attribute request instruction comprises the third environment characteristic.

5. A mobile terminal for implementing selection of a secure element in near field communication, comprising:

a memory comprising instructions; and a processor coupled to the memory, wherein the instructions cause the processor to be configured to:

receive an attribute request instruction from a peer end, wherein the attribute request instruction comprises a first environment characteristic supported by the peer end;

send an attribute response instruction to the peer end according to the attribute request instruction, wherein the attribute response instruction comprises a second environment characteristic used by the mobile terminal to select the secure element;

receive a selection instruction from the peer end, wherein the selection instruction comprises a type identifier of the secure element required by the peer end; and select, according to the selection instruction, a secure element corresponding to the first environment characteristic and the type identifier to complete interaction with the peer end.

6. The mobile terminal according to claim 5, wherein the instructions further cause the processor to be configured to select, according to a routing table, the secure element corresponding to the first environment characteristic and the type identifier.

7. An apparatus for implementing selection of a secure element in near field communication, comprising:

a memory comprising instructions; and a processor coupled to the memory, wherein the instructions cause the processor to be configured to:

send a first attribute request instruction, wherein the first attribute request instruction comprises a first environment characteristic supported by a local end;

receive a first attribute response instruction, wherein the first attribute response instruction comprises a second environment characteristic that is configured to be used by a peer end to select the secure element;

determine whether an attribute set of the first environment characteristic comprises an attribute set of the second environment characteristic; and send a selection instruction when the attribute set of the first environment characteristic comprises the attribute set of the second environment characteristic, wherein the selection instruction comprises a type identifier of a secure element required by the local end.

8. The apparatus according to claim 7, wherein the instructions cause the processor to be configured to determine whether the attribute set of the first environment characteristic comprises the attribute set of the second environment characteristic comprises the instructions further causing the processor to be configured to:

obtain a third environment characteristic when the attribute set of the first environment characteristic excludes the attribute set of the second environment characteristic, wherein the third environment characteristic comprises an attribute set that is excluded from the first environment characteristic and is comprised in the second environment characteristic; and send a second attribute request instruction, wherein the second attribute request instruction comprises the third environment characteristic.

* * * * *